US010778991B1

(12) United States Patent
Winston et al.

(10) Patent No.: US 10,778,991 B1
(45) Date of Patent: Sep. 15, 2020

(54) ADAPTIVE GROUP OF PICTURES (GOP) ENCODING

(71) Applicant: Amazon Technologies, Inc., Seattle, WA (US)

(72) Inventors: Amarsingh B Winston, Seattle, WA (US); Deepthi Nandakumar, Karnataka (IN); Avisar Ten-Ami, Mill Creek, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/141,431

(22) Filed: Sep. 25, 2018

(51) Int. Cl.
| | |
|---|---|
| *H04B 1/66* | (2006.01) |
| *H04N 7/12* | (2006.01) |
| *H04N 11/02* | (2006.01) |
| *H04N 11/04* | (2006.01) |
| *H04N 19/177* | (2014.01) |
| *H04N 19/124* | (2014.01) |
| *H04N 19/157* | (2014.01) |
| *H04N 19/176* | (2014.01) |
| *H04N 21/2662* | (2011.01) |

(52) U.S. Cl.
CPC ......... *H04N 19/177* (2014.11); *H04N 19/124* (2014.11); *H04N 19/157* (2014.11); *H04N 19/176* (2014.11); *H04N 21/2662* (2013.01)

(58) Field of Classification Search
CPC .............................. H04N 19/124; H04N 19/10
See application file for complete search history.

(56) References Cited

U.S. PATENT DOCUMENTS

| | | | | |
|---|---|---|---|---|
| 5,091,945 A * | 2/1992 | Kleijn | ..................... | G10L 19/12 704/219 |
| 6,285,796 B1 * | 9/2001 | Acharya | ................ | H04N 19/50 375/E7.243 |
| 2004/0114817 A1 * | 6/2004 | Jayant | .................... | H04N 19/00 382/239 |
| 2008/0084928 A1 * | 4/2008 | Wang | ................... | H04N 19/172 375/240.03 |
| 2008/0123738 A1 * | 5/2008 | Katsavounidis | ..... | H04N 19/159 375/240.01 |
| 2009/0010327 A1 * | 1/2009 | Cheng | .................. | H04N 19/176 375/240.03 |
| 2012/0155554 A1 * | 6/2012 | Magee | .......... | H04N 21/234309 375/240.26 |
| 2014/0321534 A1 * | 10/2014 | Su | ........................ | H04N 19/136 375/240.03 |

* cited by examiner

*Primary Examiner* — Fabio S Lima
(74) *Attorney, Agent, or Firm* — Lee & Hayes, P.C.

(57) ABSTRACT

Encoding of a video file includes determining a plurality of scenes associated with a video file, and determining at least one group of pictures (GOP). Starting sequentially from a beginning frame of the video file, the system identifies a first GOP having a first encoding error characteristic. The system changes a bitrate allocation setting from a first setting to a second setting based on the encoding error characteristic. The system identifies a second frame having a second encoding error characteristic, and changes a second bitrate allocation setting from the second setting to a third setting based on the second encoding error characteristic. The system generates an encoded video file that includes an encoded plurality of scenes.

20 Claims, 7 Drawing Sheets

ADAPTIVE GROUP OF PICTURES (GOP) ENCODING

BACKGROUND

Encoding and decoding systems and methods for MPEG and other block-based video bit-stream data are now widely known. One property of video is that for any given block of pixels (e.g. macroblock) in the video frame, there is a high correlation to neighboring blocks. Video compression technologies take advantage of this through the use of prediction. When the video is encoded, the encoder predicts block properties based on neighboring blocks and then encodes the difference (residual) from the prediction. The video decoder computes the same prediction and adds the residual to the prediction to decompress the video. Since only residuals to the predictions are sent, the amount of information sent between the encoder and the decoder is compressed. One drawback to having block properties predicted based off neighboring blocks is that if a neighboring block contains an error, for example due to interference during a broadcast or errors due to color saturation and light gradation, then all subsequent blocks will also contain an error, thereby causing an entire frame of video to be corrupted.

Another property of MPEG video that allows it to be compressed is that high frequency information can be discarded without the human vision system detecting a noticeable change in the results. Video compression standards take advantage of this property by a method called quantization. The quantization is set for a particular title during the encoding process. To do this, encoding parameters are determined for that title, and the encoding parameters are set for the entire encoding for that title.

Some titles respond differently to encoding quantization settings depending on the nature of the content. The most difficult section of the video clip or the most difficult title on the recording (that is, the content that requires the highest levels of quantization) is often the limiting factor for setting the encoding. That is to say, the entire title is encoded according to the necessary encoding requirements for the most difficult portion of that title. Accordingly, even if a majority of the title does not require the high number of bits that a higher-end encoding configuration requires, the entire title has been encoded with that setting to accommodate the few portions that do require that setting.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Group of Pictures (GOP) is a type of terminology related to MPEG video encoding. Groups of pictures are grouped together in ways that enhance the visual result of a video sequence. The philosophy is that each coded video stream has groups of GOPs. GOPs include various types of coded pictures. Encoders use groups of pictures that are organized by the types of coded pictures and other tools to render smoothly streaming video. Frame rates and other metrics may also apply.

I-Frame and GOP are video codec terms. When a video is encoded to be viewed on television (TV), data content streaming services, or any other content delivery method, the video file is to be compressed from its raw form that would otherwise be unwieldly. For example, when watching a video at 24 frames-per-second, the video is not actually seen at 24 full pictures each second. Instead, you're seeing sets of GOP (Group of Pictures) composed of inter frames (I-frames), predicted frames (P-frames) and bi-directionally predicted frames (B-frames). Depending on the codec, a GOP could consist of upwards of 15 frames.

I-frames are the complete images. The I-frame is a compressed image (in the same way a JPEG is a compressed image) but it is a complete image in the sense that every pixel is present in the file. Every GOP begins with an I-frame. Then comes the P-frames and B-frames; P-frames reference past frames and B-frames reference past and future frames. To explain it simply, P-frames and B-frames are incomplete images that reference the I-frame and surrounding images to "fill in the blanks".

Using a static shot of a car driving down the road as an example, if the camera is locked down with a tripod (that is, stationary), nothing within the environment would move in the frame (save, for example, rustling leaves on the trees). Accordingly, using a GOP encoding scenario the only thing the codec really needs to be concerned about is the car and the leaves on the trees, because they are the only objects in the frames changing. So, since the I-frame is providing reference, the codec does not need to "re-create" the clouds in the sky or the building in the distance for every frame. In most scenarios, none of that changes. Instead, P-frames and B-frames are only concerned about capturing the motion.

By creating mostly incomplete frames that reference only a few complete frames, the codec is saving significant storage space. The space saving improves both storage and accessibility. For example, for a 1080p video, the player does not need to load two-megapixel images for every frame of video. Also, the file compression resulting from the encoding process keeps file sizes small enough to be shared and streamed over the internet with the minimal bandwidth needed for streaming the content.

Quantization levels account for the degree with which the encoding system will interpolate values of predicted pixels that complete the frames. Currently the process is driven by the most challenging portion of a single title (that is, the strength of encoding needed to make the difficult portion decode properly without the introduction of artifacts in the image). The difficult portion will dictate the encoding profile for each of the device-driven encodings that will be stored in parallel on file servers. There are advantages for using the smallest amount of quantization possible while keeping the content quality. When more quantization is used, the files become increasingly large, which may be further multiplied due to the parallel file storage needed for online content delivery. In other aspects changing quantization settings may include adjusting one or more motion settings, or some other encoding aspect. It is therefore advantageous to provide a system for encoding a video title having quantization and/or other settings that are matched for individual video portions of a single title.

According to one example, a computer-implemented method for encoding a video file includes segmenting the video file into a plurality of scenes. For example, there are known methods for identifying the end of one scene and the beginning of the next scene in a video file. Although outside of the scope of this disclosure, techniques used may include evaluating the difference in luminance values from one frame to the next, where drastic changes in pixel luminance may indicate the start of a new scene. In an example embodiment, the encoding system may start encoding sequentially from a beginning frame of a raw video file. The system identifies a first frame with a characteristic that indicates erroneous encoding. An encoding error characteristic may be, for example, an artifact in an image, false image edges, or some other encoding error.

Motion-compensated edge artifacts, for example, are typical in video codecs that use block-based motion compensated prediction. When a quantization parameter setting on the encoding tool is set to a relatively low setting (for example 10 out of 50), then the setting is said to be low, weak, course, or other terms identifying a relatively low quantization. When coarse quantization is combined with motion compensation prediction, blocking artifacts propagate from I-frames into subsequent frames and accumulate, causing structured high frequency noise that is no longer located at block boundaries (off grid). By definition, the artifacts involve high frequency noise within the blocks, while the blocking impairment involves high frequency noise along the block boundaries (on grid).

Block-based hybrid video encoding schemes such as the MPEG and h.26* codec families are inherently lossy processes. They achieve compression not only by removing truly redundant information from the bitstream, but also by making small quality compromises in ways that are intended to be minimally perceptible. In particular, the quantization parameter (QP) regulates how much spatial detail is saved. When QP is very small, almost all that detail is retained. As QP is increased, some of that detail is aggregated so that the bit rate drops—but at the price of some increase in distortion and some loss of quality. If saving space is of the highest importance, (that is, if you want to lower bit rate), lower bit rates are accomplished by lowering QP at a cost of increased distortion. In embodiments described herein, changing QP may be and/or include changing bitrate allocation within and/or across one or more frames of the video file.

There are known correlations between certain types of video content and higher (or lower) tendencies encoding errors. For example, it has been observed that darker scenes in video content require higher QP settings to avoid erroneous artifacts in the encoded data. These phenomena are accentuated in instances of dark scenes with a focal point of light, such as a candle in a dark room, that fills the frame with varying pixel luminance as the single light source interacts with objects in the lighted room. For example, a smooth pillar in a dark room may present high variation in luminance from the lit side of the pillar as compared to the darkened side of the pillar when the room is lit by a single light source such as a candle. If the QP setting is low (e.g., if the QP varies from 1 to 50 and the QP is set to 40) then the encoded video file may have a high likelihood of producing artifacts such as false edges in the graduated light images. Accordingly, as used herein, an encoding error characteristic may be a characteristic of video content that is known to produce a high likelihood of an encoding error (e.g., an artifact, false edge, etc.) given a predetermined QP setting.

Encoding errors may also be related to a general type of content in the video file. For example, an animated video file can have a predictably different response to a given QP setting than a live action scene with low light levels. Other examples may include scenes having repetitive patterns in the image such as stripes, dots, or other patterns. Accordingly, an encoding error characteristic may also include characteristics in video content that are known to produce few errors given a predetermined QP setting. For example, animated frames render well (that is, without artifacts) with relatively low QP settings on the encoder. Although a full listing of known correlations between types of scenes and corresponding encoded video output given a particular QP setting is outside of the scope of this disclosure, it should be appreciated that there are various known correlations that may be identified and recorded on a computer-readable medium storing a lookup table.

In an example embodiment of dynamic encoding of a video file, the system may dynamically change the QP setting according to detected problem areas within given GOPs of a raw video file. In an embodiment, the system may set an initial QP setting that is relatively low, which outputs an encoded video file size that is smaller than the output with higher settings. The system then starts encoding the video file sequentially from a beginning frame of the file. Frame by frame, the system may encode the current frame using a default QP setting, until the system identifies a first frame that has an encoding error characteristic. The encoding error characteristic informs the processor that the frame (and subsequent frames with similar images) are likely to be problematic for lower QP settings. The QP setting can include an adaptive quantization adjustment that has a dynamically changeable setting. The plurality of settings that modify bitrate allocation within and across frames of the sequence. In one aspect, a bitrate allocation may include one or more settings that control adaptive quantization. Although specific encoders are not contemplated in this description, it should be appreciated that encoders may include settings ranging from no adaptive quantization to relatively high adaptive quantization.

Figure 1:
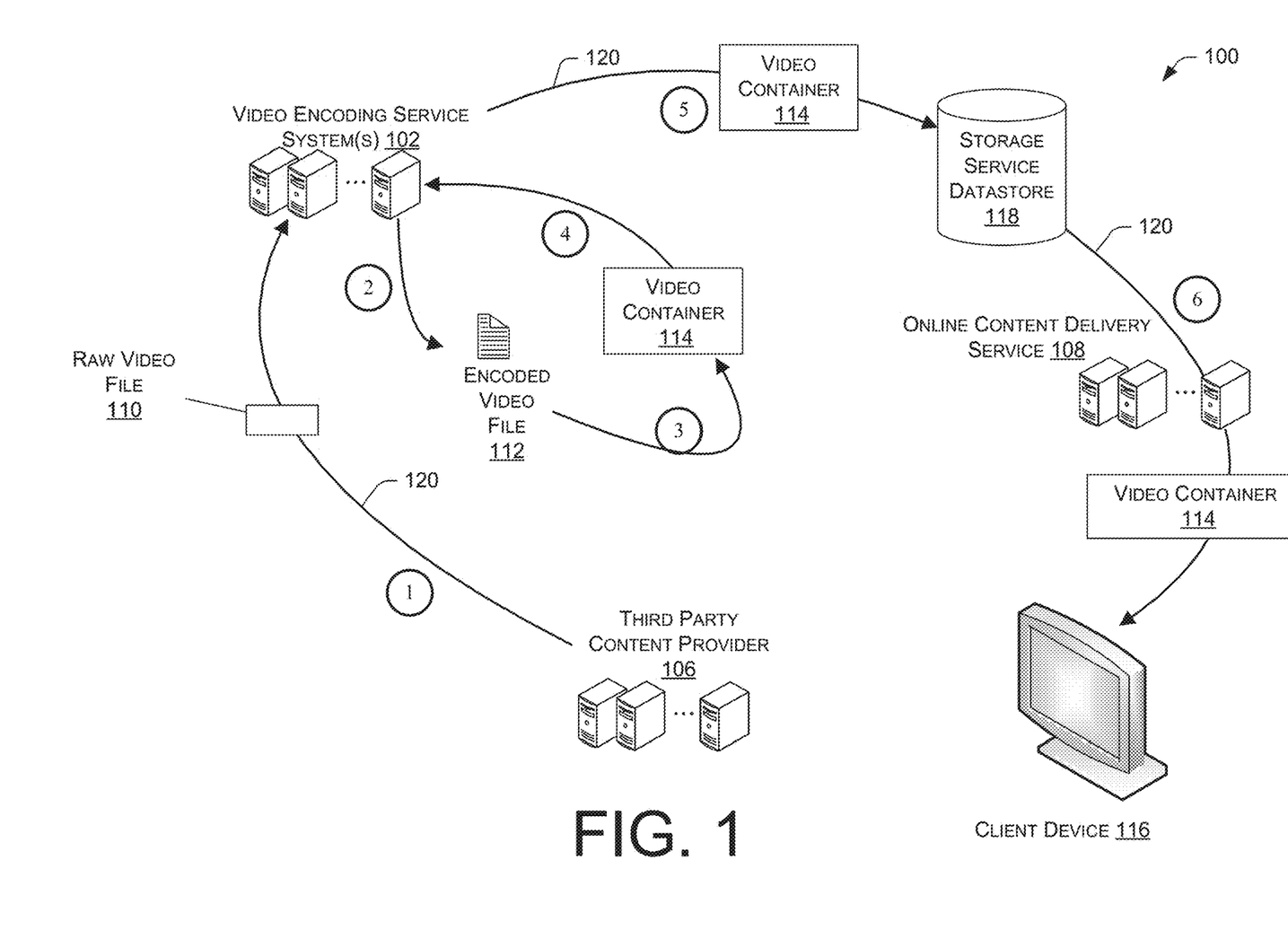
FIG. 1 is a schematic diagram of an illustrative environment that includes services and systems to enable generation of a dynamically encoded video file, according to example embodiments of the disclosure.

FIG. 1 is a schematic diagram of an illustrative computing environment 100 that includes services and systems to enable generation of a dynamically encoded video file, according to example embodiments of the disclosure. The computing environment 100 includes one or more video encoding service system(s) 102. The video encoding service system 102 is in communication with a storage service datastore 104 via one or more computer networks 120 (represented as arrows in FIG. 1). The video encoding service system 102 is operatively connected with one or more third party content providers 106 via the network 120. An online content delivery system 108 may be in communication with the storage service datastore 104. A client device 116 connects with the online content delivery system 108 to download online video content.

The network 120 includes, for example, the Internet, intranets, extranets, wide area networks (WANs), local area networks (LANs), wired networks, wireless networks, or other suitable networks, etc., or any combination of two or more such networks.

The video encoding service system 102 may include, for example, a server computer or any other system providing computing capability. Alternatively, a plurality of computing devices may be employed that are arranged, for example, in one or more server banks or computer banks or other arrangements. For example, a plurality of computing devices together may comprise a cloud computing resource, a grid computing resource, and/or any other distributed computing arrangement. Such computing devices may be located in a single installation or may be distributed among many different geographical locations. For purposes of convenience, the video encoding service system 102 is referred to herein in the singular. Even though the video encoding service system 102 is referred to in the singular, it is understood that a plurality of computing devices may be employed in the various arrangements as described above.

Various applications and/or other functionality may be executed in the video encoding service system 102 according to various embodiments. Also, various data is stored in the storage service datastore 104 that is accessible to the video encoding service system 102. The storage service datastore 104 may be representative of a plurality of data stores as can be appreciated. The data stored in the storage service datastore 104 includes, for example, video data 114, and potentially other data.

The client device 116 is representative of a plurality of content playback devices that may be coupled to the network 120. The client device 116 may include, for example, a processor-based system such as a computer system. Such a computer system may be embodied in the form of a desktop computer, a laptop computer, a personal digital assistant, a mobile telephone, set-top box, music players, handheld devices, tablet computer systems, game consoles, electronic book (eBook) reader devices, or other devices with like capability.

The components executed on the video encoding service system 102, and online content delivery systems 108, for example, include a video streaming service, and other applications, services, processes, systems, engines, or functionality not discussed in detail herein. The video streaming service is executed to facilitate the streaming of video data (video container 114) over the network 120 to the client device 116.

The computing environment 100 is used for producing dynamically-encoded video content for various purposes, including for providing online content delivery to the client device 116. For example, in an embodiment, as indicated (1), the video encoding service system 102 may receive a raw video file 110 from a third-party content provider 106. The third-party content provider may be, for example, a video producer, or a server delivering such content.

The raw video file 110 may be, for example, an uncompressed digital video file that either has never been compressed or was generated by decompressing previously compressed digital video. Uncompressed (raw) video content may be content delivered by a movie studio or amateur video content producer. The raw video file 110 may be a file that has not been processed for online content delivery by encoding the raw file.

In an embodiment, at step (2), the video encoding service system 102 may produce a dynamically-encoded video file 112. The dynamically-encoded video file 112 is a video file that has been encoded according to embodiments described hereafter by determining whether a GOP in a video file includes frames predicted to have difficult content for encoding using low levels of adaptive quantization. As explained in previous paragraphs, the system 102 may evaluate each frame or set of frames in the GOPs of the raw video file 110, dynamically set the QP for that upcoming frame, and encode the frame using the dynamically-adjusted QP setting.

As shown at step (3), the video encoding system 102 outputs the encoded video file 112 and packages it in a video container 114. A video container (or wrapper format) is a metafile format whose specification describes how different elements of data and metadata coexist in a computer file. Since the container does not describe how data or metadata is encoded, a program able to identify and open a container file might not be able to decode the contained data. This may be caused by the program lacking the required decoding algorithm.

By definition, a container format may wrap any kind of video data. Though there are some examples of such file formats (e.g. DLL files), most container formats are specialized for specific data (video playback) requirements. For example, a popular family of containers is found for use with multimedia file formats. Since audio and video streams can be coded and decoded with many different algorithms, a container format may be used to provide a single file format to the user. The container file is used to identify and interleave different data types. Simpler container formats can contain different types of audio formats, while more advanced container formats can support multiple audio and video streams, subtitles, chapter-information, and meta-data (tags)—along with the synchronization information needed to play back the various streams together. In most cases, the file header, most of the metadata and the synchro chunks are specified by the container format. For example, container formats exist for optimized, low-quality, internet video streaming which differs from high-quality Blu-ray streaming requirements. Accordingly, the video encoding service system 102 may produce a video container 114 for known categories of client devices 116 that will be streaming the online content.

At step (5) the video encoding service system 102 may store the video container 114 containing the dynamically-encoded video file 112 to the storage service datastore 104. At step (6), the online content delivery system 108 may receive a request for a particular title stored in the video container 114. The online content delivery system 108 may retrieve the video container 114 from the storage service datastore 104, and provide (stream) that title to the client device 116.

Figure 2:
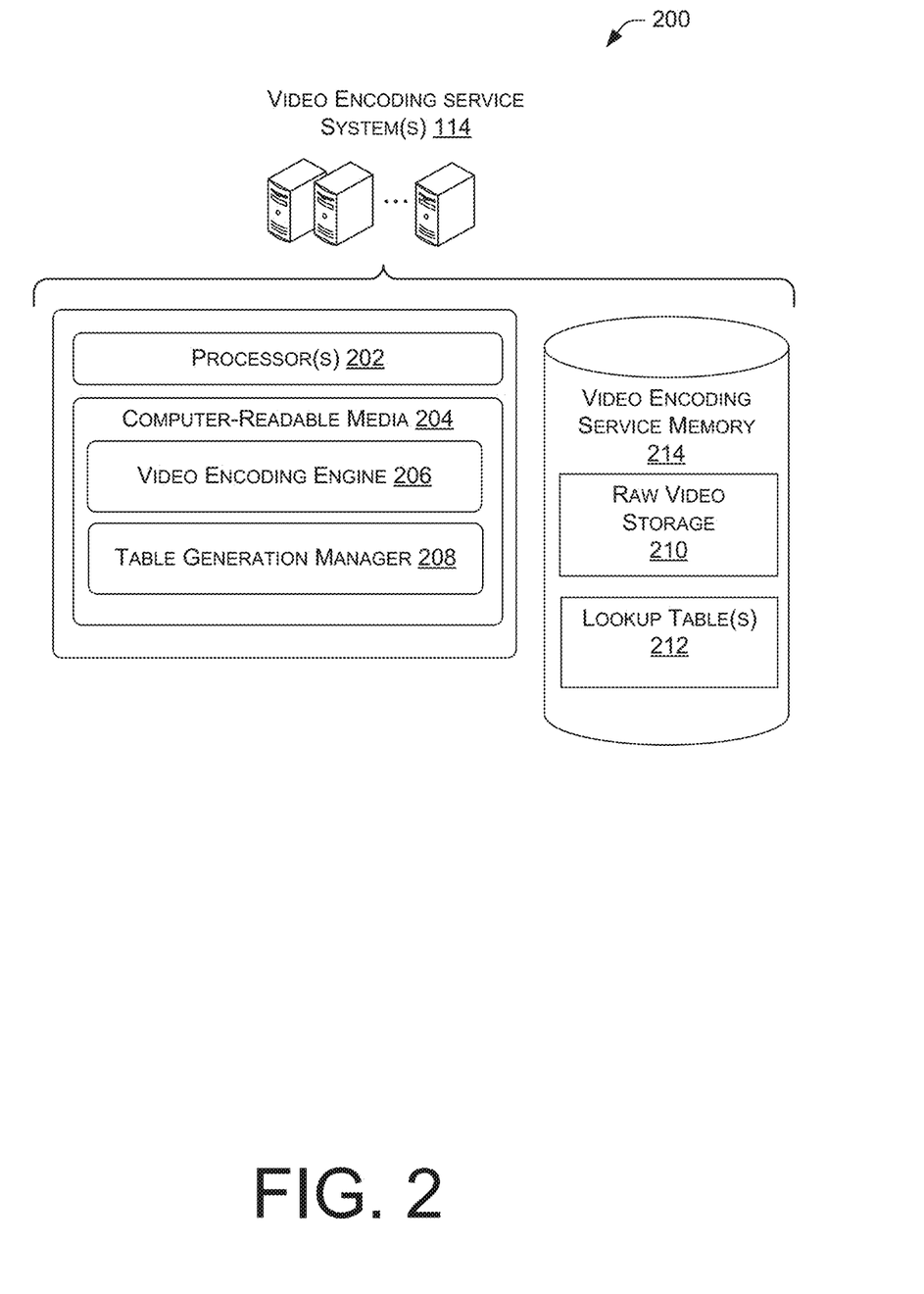
FIG. 2 is a schematic diagram of the illustrative computing architecture of the video encoding service system, as shown in FIG. 1, according to example embodiments of the disclosure.

FIG. 2 is a schematic diagram of the illustrative computing architecture 200 of the video encoding service system, as shown in FIG. 1, according to example embodiments of the disclosure. The computing architecture 200 may be implemented in a distributed or non-distributed computing environment. FIG. 2 depicts an illustrative computer hardware architecture for implementing a computing device that can be utilized to implement aspects of the various technologies presented herein, according to example embodiments of the disclosure. The computer architecture depicted illustrates a conventional server computer, workstation, desktop computer, laptop, tablet, network appliance, e-reader, smartphone, or other computing device, and can be utilized to execute any of the software components presented herein.

The computing architecture 200 may include one or more processors 202 and one or more computer readable media 204 that stores various modules, applications, programs, or other data. The computer-readable media 204 may include instructions that, when executed by the one or more processors 202, cause the processors to perform the operations described herein for the video encoding service systems 102. In one illustrative configuration, one or more central processing units ("CPUs") operate in conjunction with a chipset. The CPUs can be standard programmable processors that perform arithmetic and logical operations necessary for the operation of the computing architecture 200. The processors 202 operate in conjunction with the chipset. The CPUs can be standard programmable processors that perform arithmetic and logical operations necessary for the operation of the computer.

In some implementations, the processors(s) 202 may include a central processing unit (CPU), a graphics processing unit (GPU), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 202 may possess its own local memory, which also may store program modules, program data, and/or one or more operating systems. The one or more processor(s) 202 may include one or more cores.

The CPUs perform operations by transitioning from one discrete, physical state to the next through the manipulation of switching elements that differentiate between and change these states. Switching elements can generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset provides an interface between the CPUs and the remainder of the components and devices on the baseboard 1202. The chipset can provide an interface to a RAM, used as the main memory in the computer. The chipset can further provide an interface to a computer-readable storage medium such as a read-only memory ("ROM") or non-volatile RAM ("NVRAM") for storing basic routines that help to startup the computer and to transfer information between the various components and devices. The ROM or NVRAM can also store other software components necessary for the operation of the computer in accordance with the configurations described herein.

The computer can operate in a networked environment using logical connections to remote computing devices and computer systems through a network, such as the network. The chipset can include functionality for providing network connectivity through a NIC, such as a gigabit Ethernet adapter. The NIC is capable of connecting the computer to other computing devices over the network. It should be appreciated that multiple NICs can be present in the computer, connecting the computer to other types of networks and remote computer systems.

The computer can be connected to a mass storage device that provides non-volatile storage for the computer. The mass storage device can store an operating system, programs, and data, which have been described in greater detail herein. The mass storage device can be connected to the computer through a storage controller connected to the chipset. The mass storage device can consist of one or more physical storage units. The storage controller can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer can store data on the mass storage device by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device is characterized as primary or secondary storage, and the like.

For example, the computer can store information to the mass storage device by issuing instructions through the storage controller to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer can further read information from the mass storage device by detecting the physical states or characteristics of one or more particular locations within the physical storage units.

In addition to the mass storage device described above, the computer can have access to other computer-readable storage media to store and retrieve information, such as program modules, data structures, or other data. It should be appreciated by those skilled in the art that computer-readable storage media is any available media that provides for the non-transitory storage of data and that can be accessed by the computer.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device can store an operating system utilized to control the operation of the computer. According to one configuration, the operating system comprises the LINUX operating system or one of its variants such as, but not limited to, UBUNTU, DEBIAN, and CENTOS. According to another configuration, the operating system comprises the WINDOWS SERVER operating system from MICROSOFT Corporation. According to further configurations, the operating system can comprise the UNIX operating system or one of its variants. It should be appreciated that other operating systems can also be utilized. The mass storage device can store other system or application programs and data utilized by the computer.

In one configuration, the mass storage device or other computer-readable storage media is encoded with computer-executable instructions which, when loaded into the computer, transform the computer from a general-purpose computing system into a special-purpose computer capable of implementing the configurations described herein. These computer-executable instructions transform the computer by specifying how the CPUs transition between states, as described above. According to one configuration, the computer has access to computer-readable storage media storing computer-executable instructions which, when executed by the computer, perform the various processes described above. The computer can also include computer-readable storage media for performing any of the other computer-implemented operations described herein.

The computer can also include one or more input/output controllers for receiving and processing input from a number of input devices, such as a keyboard, a mouse, a touchpad, a touch screen, an electronic stylus, or other type of input device. Similarly, an input/output controller can provide output to a display, such as a computer monitor, a flat-panel display, a digital projector, a printer, or other type of output device. It will be appreciated that the computer might not include all of the components shown in FIG. 2, can include other components that are not explicitly shown in FIG. 2, or can utilize an architecture completely different than that shown in FIG. 2.

Embodiments may be provided as a computer program product including a non-transitory machine-readable storage medium having stored thereon instructions (in compressed or uncompressed form) that may be used to program a computer (or other electronic device) to perform processes or methods described herein. The computer-readable media 204 may include volatile and/or nonvolatile memory, removable and non-removable media implemented in any method or technology for storage of information, such as computer-readable instructions, data structures, program modules, or other data. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks.

In some embodiments, the computer-readable media 204 may store a video encoding engine 206, and a table generation manager 208. The computing architecture 200 may include and/or have access to a video encoding service memory 214.

The video encoding service memory 214 is a non-transitory computer processor 202 readable storage medium that includes information including, for example, raw video storage 210, and one or more lookup tables 218.

The raw video storage 210 may store the raw video files (e.g., the raw video file 110 as shown in FIG. 1). The one or more lookup tables 218 may include lookup tables for performing various aspects of the dynamic encoding process. For example, a lookup table may be provided for recording known correlations between encoding error characteristics (e.g., macroblock conditions that indicate the likely presence of difficult material that requires higher levels o QP) and corresponding QP settings to for producing output of adequate quality given that encoding error characteristic. In other aspects, the table generation manager 208 may generate one or more lookup tables 218 that identify portions of a video file, where each of the portions are correlated with respective QP settings needed to produce dynamically-encoded video output.

Figure 3:
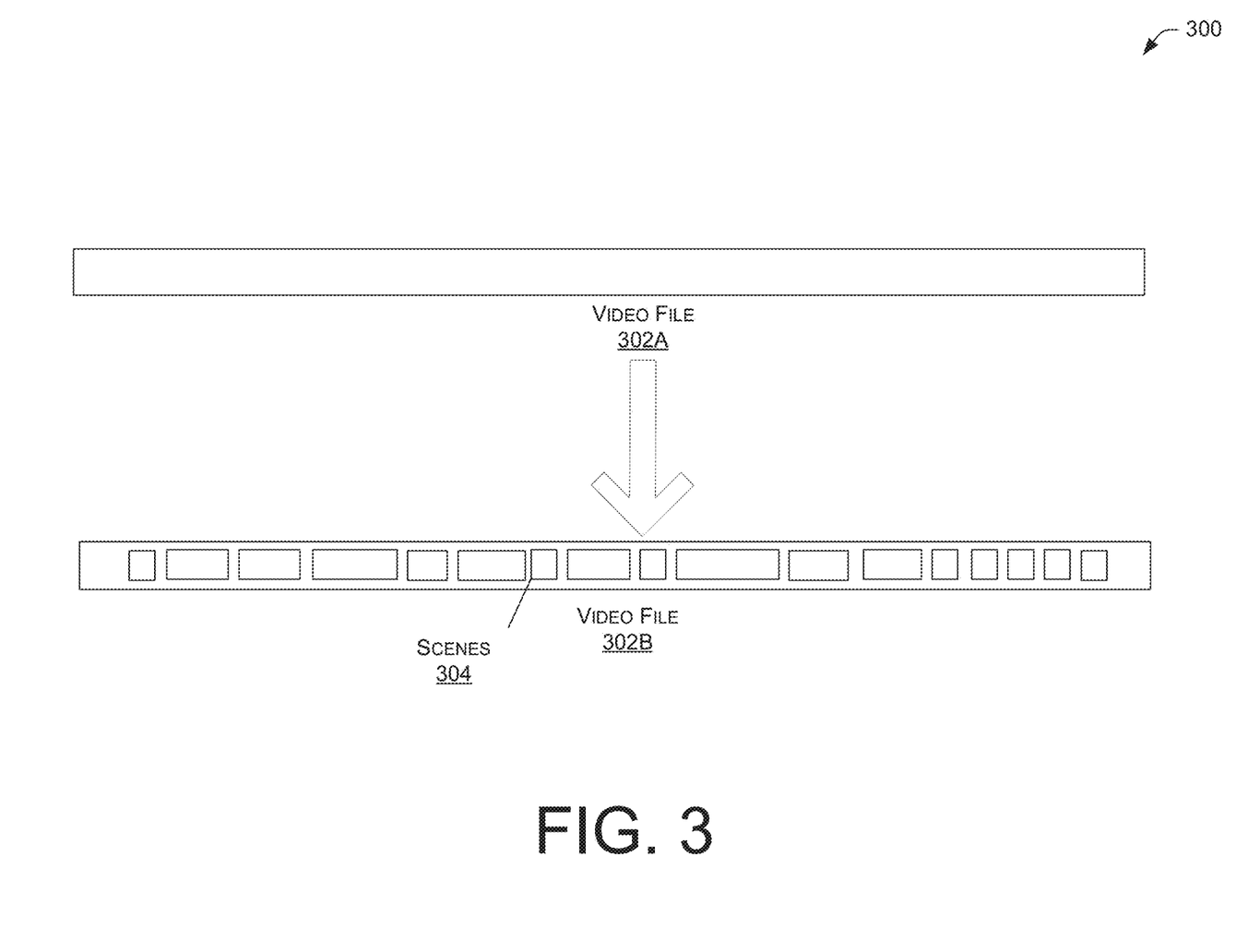
FIG. 3 is a block diagram illustrative of segmenting a video file into a plurality of scenes using the computing architecture of FIG. 2, according to example embodiments of the disclosure.

FIG. 3 is a block diagram illustrative of segmenting a video file 302A that is processed into a segmented video file 302B. By segmenting the video file portions of similar video will be grouped together, which may speed the dynamic encoding process. The segmented video file 302B includes a plurality of scenes 304. The system 102 segments the video file 302A using the computing architecture of FIG. 2, according to example embodiments of the disclosure. There are known techniques for segmenting the video file 302A into a scene-segmented video file 302B. For example, some systems may automatically scan the video file 302A and identify the beginning frame of a new scene 304 by identifying changes in pixel luminance, changes in motion from frame to frame, changes in objects within a frame, or any of many other methods. Although describing the many known ways for automatic scene segmentation are not discussed herein, it should be appreciated that the processor 202 may generate a scene-segmented video file 302B using one or more known methods. After segmenting the video file 302A into scenes, the plurality of scenes 304 may be analyzed using a group of pictures (GOP) approach.

Figure 4:
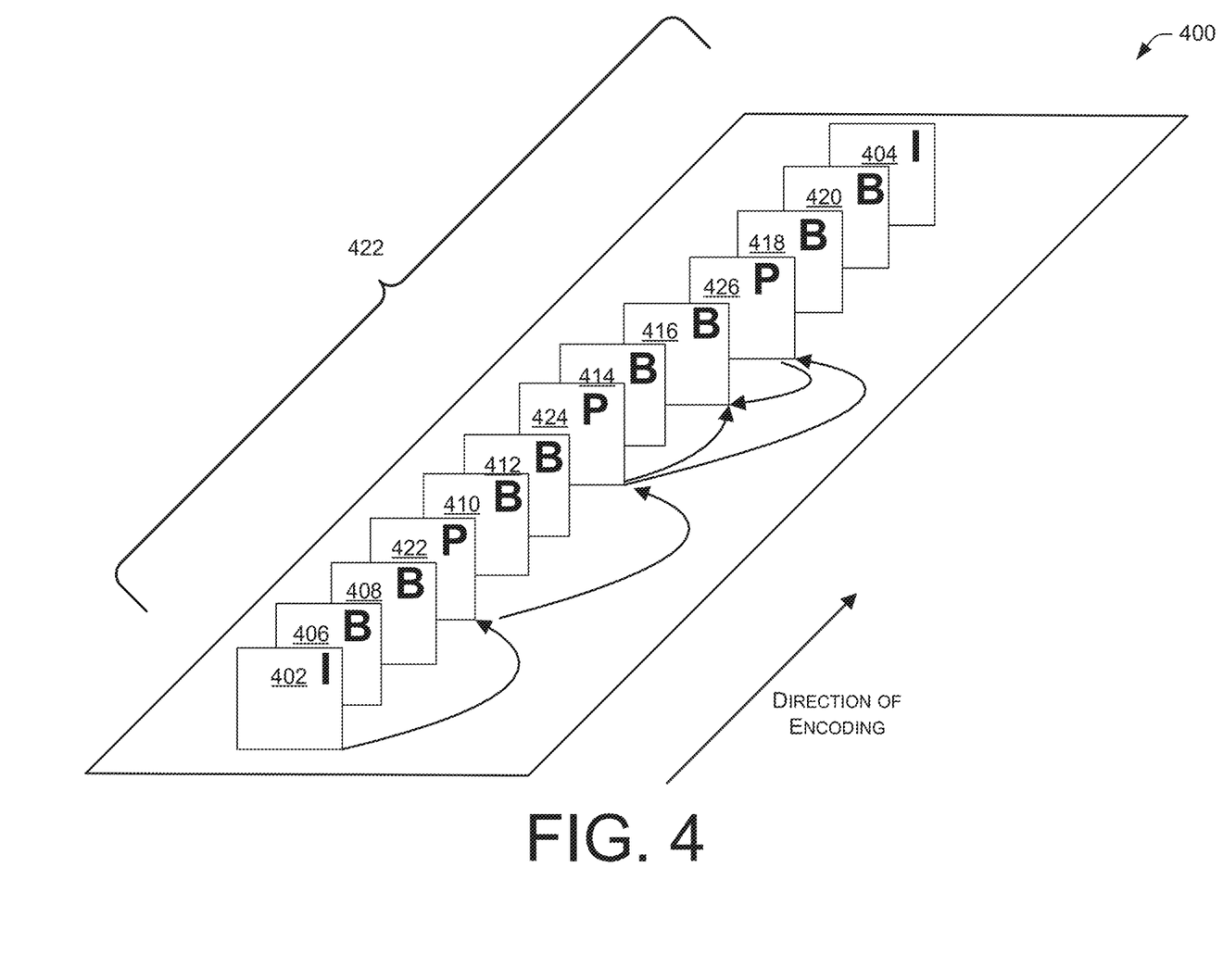
FIG. 4 is a block diagram of encoding steps for dynamically encoding a video file using the computing architecture of FIG. 2, according to example embodiments of the disclosure.

FIG. 4 is a block diagram of encoding steps for dynamically encoding a scene 400 of a video file using the computing architecture of FIG. 2, according to example embodiments of the disclosure. The scene 400 is represented as a plurality of frames 422. The plurality of frames 422 is represented in a group of pictures (GOP) format that includes inter frames (or I-frames) 402 and 404, B-frames 406, 408, 410, 412, 414, 416, 418, and 420, and a plurality of P-frames 422, 424, and 426.

The scene encoding scenario of FIG. 4 depicts a GOP approach to encoding the scenes 422. In a GOP encoding scheme, a frame stream has three kinds of frames within it: Intraframes (like a JPEG still); Prediction Frames (those predicted from Intraframes), and Bidirectional Frames (those predicted from both Intra Frames and Prediction Frames). These frames are commonly referred to by their abbreviations: I frames, P frames, and B frames. The I frames, the P frames, and the B frames are together referred to as a group of pictures (GOP).

An intraframe or "I-frame" is a frame in a video compression stream that is expressed in terms of one or more neighboring frames. The "inter" part of the term refers to the use of inter-frame prediction. I-frames do not produce very much compression, after the I-frames have been encoded. They are considered "anchor frames" for the MPEG system. As understood in the art of video processing and encoding, this kind of prediction attempts to take advantage of temporal redundancy between neighboring frames, enabling higher compression rates. An inter coded frame is divided into blocks known as macroblocks. After that, instead of directly encoding the raw pixel values for each block, the encoder will attempt to identify a block similar to the block that the encoder is encoding on a previously encoded frame, referred to as a reference frame. This process is frequently performed by a block matching algorithm. If the encoder succeeds on its search, the block could be encoded by a vector, known as motion vector, which points to the position of the matching block at the reference frame. The process of motion vector determination is called motion estimation.

In most cases the encoder will succeed, but the block found is likely not an exact match to the block the encoder is encoding. For this reason, the encoder may compute the differences between two compared blocks. Those residual values are known as the prediction error and are transformed and sent to the decoder (e.g., the client device 116).

P-frames 422, 424, and 426 are the forward predicted pictures. P-frames provide more compression than the I-frames, as the P-frames are predicted from the I-frames. The video encoding engine 206 makes this prediction from an earlier picture, mainly the I-frame 402, so that the processor 202 requires less coding data (for example, a reduction of 50% may be expected). From a mathematical perspective, the amount of data utilized for this prediction consist of motion vectors and transform coefficients describing prediction correction. It involves the use of motion compensation, as known in the art.

The B-frames 402-420 are bidirectionally predicted pictures. B-frames provide a higher degree of compression, as compared to I-frames and P-frames, as the B-frames are predicted from the other two types of frames (e.g., I-frames and P-frames)—the B-frames are mathematically derived from surrounding frames. If the math predicting the B-frames is accurate, the B-frames will look just like the equivalent frames in full-motion video, once they have been decoded by the client device 116. If the data is not an accurate depiction of the underlying image, artifacts are likely to appear.

The GOP prediction scheme described above occupies less coding data than P-frames (about 25% reduction when compared to I-frame size) because the frames can be predicted or interpolated from an earlier frame and/or later frame. Similar to the P-frames 422-426, from a mathematical processing perspective, the B-frames 402-420 are expressed as motion vectors and transform coefficients. In order to avoid a growing propagation error, B-frames are not used as a reference to make further predictions in most encoding standards.

Forward prediction uses information from previous frames to create a "best guess" for the frame that the processor 202 is currently processing. Backward prediction does the opposite—the processor 102 uses information from frames yet to come and creates a best guess (e.g., a mathematical approximation that represents the image data) for the present frame. Bi-directional prediction is a combination of the two (both forward prediction and backward prediction).

For example, the B-frame 416 may be bi-directionally decoded from frame 424 and 426. From a decoding perspective, if frame 416 is to be decoded, then frames 402, 422, 424, and 426, are first decoded. That is, the direction of encoding is linear starting from frame 402 to the final I-frame 404 at the end of the scene 400. However, the decoding follows the hierarchical approach shown in FIG. 4.

Figure 5:
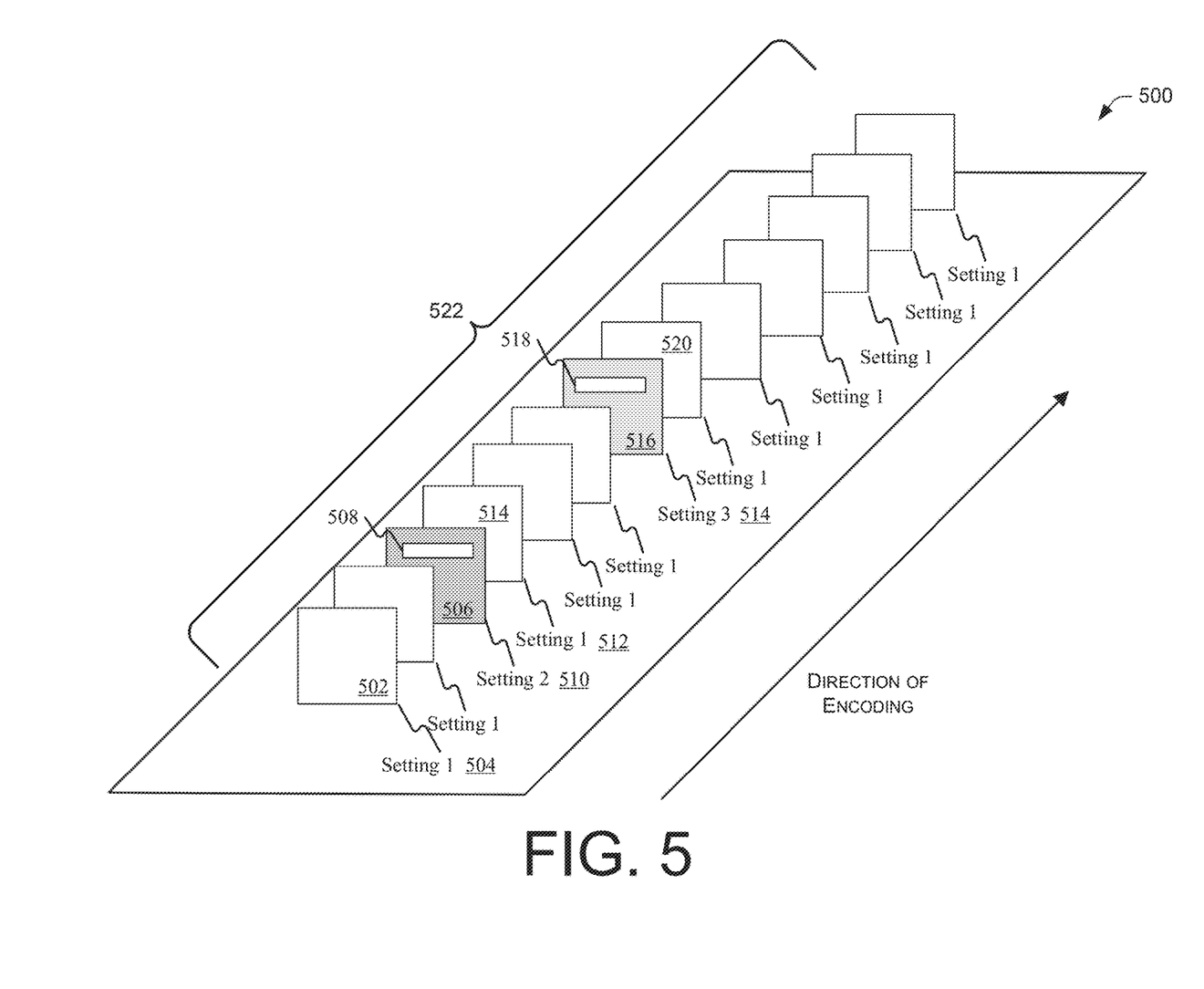
FIG. 5 another block diagram of encoding steps for dynamically encoding a video file using the computing architecture of FIG. 2, according to example embodiments of the disclosure.

After briefly discussing a general GOP encoding scheme as shown in FIG. 4, it will now be described how the hierarchical structure of GOP encoding may be used for dynamically encoding the series of frames of a scene. FIG. 5 depicts another block diagram of encoding steps for dynamically encoding a video file using the computing architecture of FIG. 2, according to example embodiments of the disclosure. By using the prediction algorithms in the GOP encoding scheme described above, the processor 202 can dynamically change a quantization parameter (QP) setting as the system sequentially processes each frame. Because GOP encoding predicts frame content based on surrounding frames, the processor 202 may also evaluate each successive frame to determine whether that frame includes an encoding error characteristic that may trigger a higher QP setting for that (and surrounding) frames.

In one embodiment, the processor 202 may process a first scene 500 in a video file by identifying the group of pictures 522, and more particularly, locating the first picture 502 in the sequence of pictures. The processor 202 may set an initial setting 504 for QP on the encoding engine 206. Using the GOP encoding scheme as described in FIG. 4, the processor 202 may encode each successive frame of the plurality of frames 522 until a frame 506 is identified that has an encoding error characteristic 508 (such as, for example, a dimly-lit image having a single source of illumination of the objects in the image). The processor 202 may identify the encoding error characteristic 508 by identifying one or more characteristics in the images of the frame 506, accessing the lookup table 218 stored in the video encoding service memory 214, and identifying a known correlation between the encoding error characteristic 508 and a predetermined setting 510 associated with that particular encoding error characteristic. The predetermined setting (setting 2) 510 may have a higher QP setting than the initial setting (setting 1 504).

After processing the frame 506 with the higher setting 510, the processor 202 sets the QP setting to the initial setting 504. FIG. 5 represents the first setting as setting 512 to indicate a new instance of the first setting although the intended interpretation is that setting 504 and setting 512 are the same default or initial setting 504. In this example, the subsequent frame 514 was processed with the initial QP setting 512 because frame 514 does not include an encoding error characteristic. In another embodiment, two contiguous frames may include (and in fact, may be likely to include) the same or similar encoding error characteristic 508. However, in the present example, the processor 202 may continue to sequentially encode the frames using the first setting 512 until a second frame 516 is identified, where the second frame 516 includes a second encoding error characteristic 518.

In one example, the second encoding error characteristic 518 is the same characteristic 508. In another aspect, they may be different encoding error characteristics that are identified by different unrelated criteria in the frame 516.

After identifying the first sequential frame 506 that includes the encoding error characteristic 508, the system changes the QP setting from the first initial setting, which has a relatively lower resolution setting, to a second setting that is a higher resolution setting than the first QP setting. With the QP set to the second setting, the system can predictably encode the first identified problem area with the enhanced setting that will most likely result in an artifact-free encoded video portion.

After encoding the first sequential frame 506 that includes the encoding error characteristic 508, the system goes to the next sequential frame 516, and sets the QP setting to a third setting 514, that may be the same higher setting as the present QP setting 512, a higher setting than the present QP setting 512, or the default first setting 504. If the next sequential frame does not include an encoding error characteristic, the system returns the QP setting from the second (higher) setting 510 back to the first (default) setting 512 to encode that frame. If the next sequential frame 520 includes a different encoding error characteristic (for example, a greater degree of luminance variation between a given block of pixels), then the system 102 may set the QP setting to an even higher setting than the second QP setting 510, which applies more adaptive quantization. The processor 202 processes the frames 522 sequentially in a similar way until all frames 522 (or substantially all) are dynamically encoded. By dynamically changing the QP of the encoder using the GOP encoding scheme, the system can output an encoded video file having only the amount of data-rich content necessary for error-free (or generally error-free) playback of the encoded video file.

Figure 6:
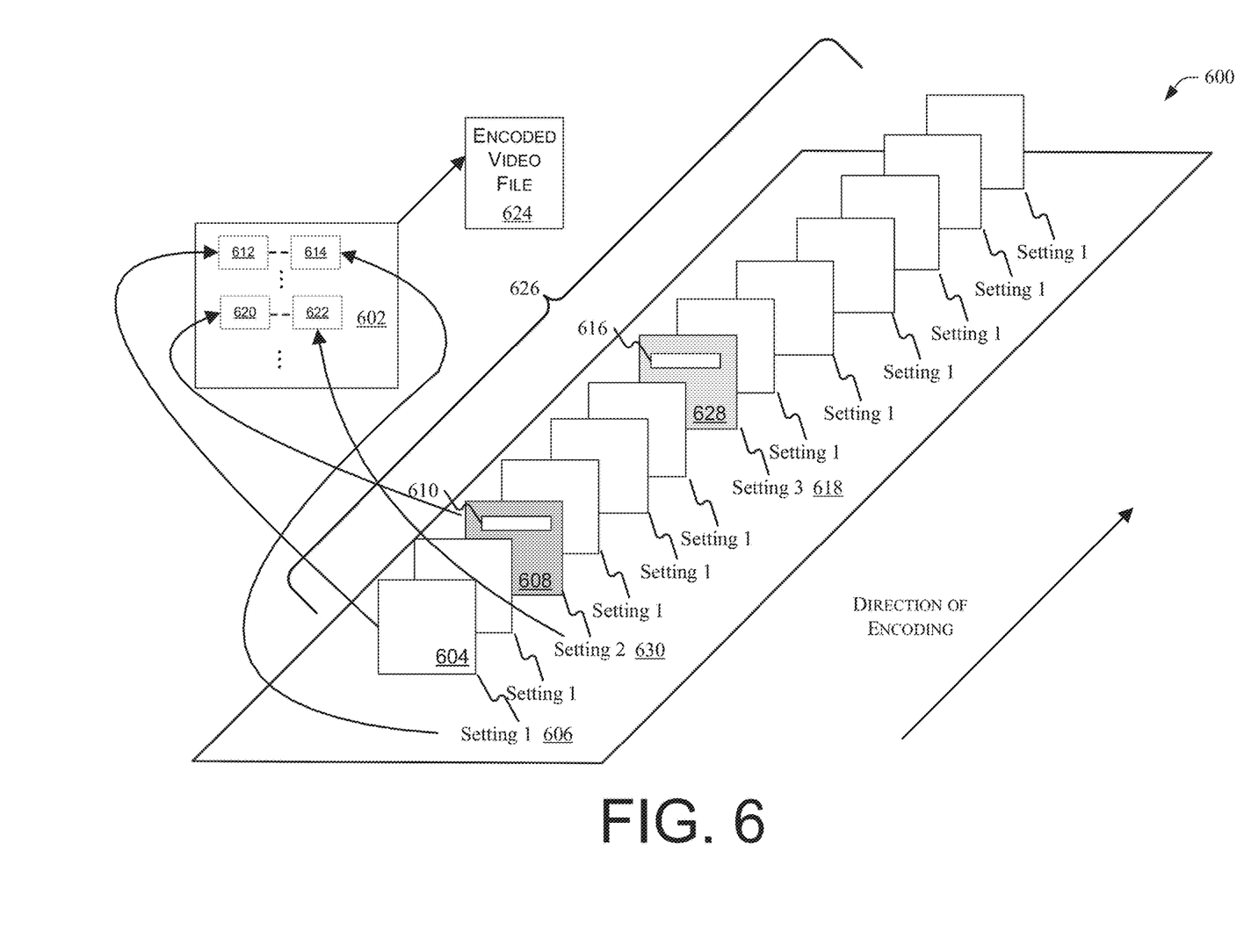
FIG. 6 is another block diagram of encoding steps for dynamically encoding a video file using the computing architecture of FIG. 2, according to example embodiments of the disclosure.

FIG. 6 is another block diagram of encoding steps for dynamically encoding a video file using the computing architecture of FIG. 2, according to example embodiments of the disclosure. A plurality of frames 626 are shown. Also depicted is a lookup table 602 that correlates each frame of the plurality of frames 626 with a particular QP setting. In an embodiment, it may be advantageous to identify all frames in the plurality of frames 626 that have an encoding error characteristic (for example, encoding characteristics 610 and 616) prior to generating an encoded video file 624. In one aspect, the system first creates a lookup table 602 having correlations between video portions having the encoding error characteristic (for example frames 608 and 630) and a respective QP setting (e.g., setting 1 (626) and setting 3 (618), respectively) for each portion. With this method, once the video file has been dynamically processed by identifying all areas of difficulty, and after a lookup table 602 is generated (or at least accessed), then the processor may encode the frames 626 using the lookup table 602, and output an encoded video file 624.

For example, the processor 202 may start sequentially from a beginning frame 604 of the video file, and create and populate the lookup table 602 with values identifying and correlating frames (e.g., the value 612 that identifies frame 604) with a corresponding setting value for that frame (e.g., value 614 that describes setting 606). Accordingly, the system may identify a first frame 608 having a first encoding error characteristic 610. The processor 202 may update the lookup table 602 to include metadata 620 identifying the first frame 608 with the first encoding error characteristic 610, and metadata 622 indicative of a second value 626 that indicates the setting associated with the frame 608. For example, the setting 630 may include a first changeable quantization parameter based on the first encoding error characteristic 610. The setting 2 630 may be a single setting or a plurality of settings, and may include other changeable aspects for encoding the plurality of frames 626.

The processor 202 identifies all other frames of the plurality of frames 626 having encoding error characteristics (and identifies those frames having no characteristics of error at all), and updates the lookup table 602 in a similar way. For example, the processor 202 identifies a second frame 614 having a second encoding error characteristic 616. The processor 202 updates the lookup table 602 to include metadata 620 identifying the second frame 614 and a second value 622 indicative of a second changeable quantization parameter from the second setting 618 based on the encoding error characteristic 616. Once the processor 202 determines that all GOPs (or substantially all of the GOPs) in the video file have been analyzed, and the lookup table 602 is complete (meaning all frames of the video file are associated with a predetermined value for QP that that renders that particular image or set of images without producing an artifact or other encoding error), the processor 202 may generate an encoded video file 624 using the lookup table 602.

In some embodiments, after a particular frame is assigned a corresponding setting, it should be appreciated that the setting may or may not change values for subsequent frames. Stated in another way, a setting is assigned to each of the frames 626, however the assigned setting may be the same for any number of subsequent frames because each of the subsequent frames having the same setting have similar attributes that merit such a setting. For example, all frames between 608 and 628 may have the same setting, a different setting. Each frame encoding is set according to the attributes of that frame.

Figure 7:
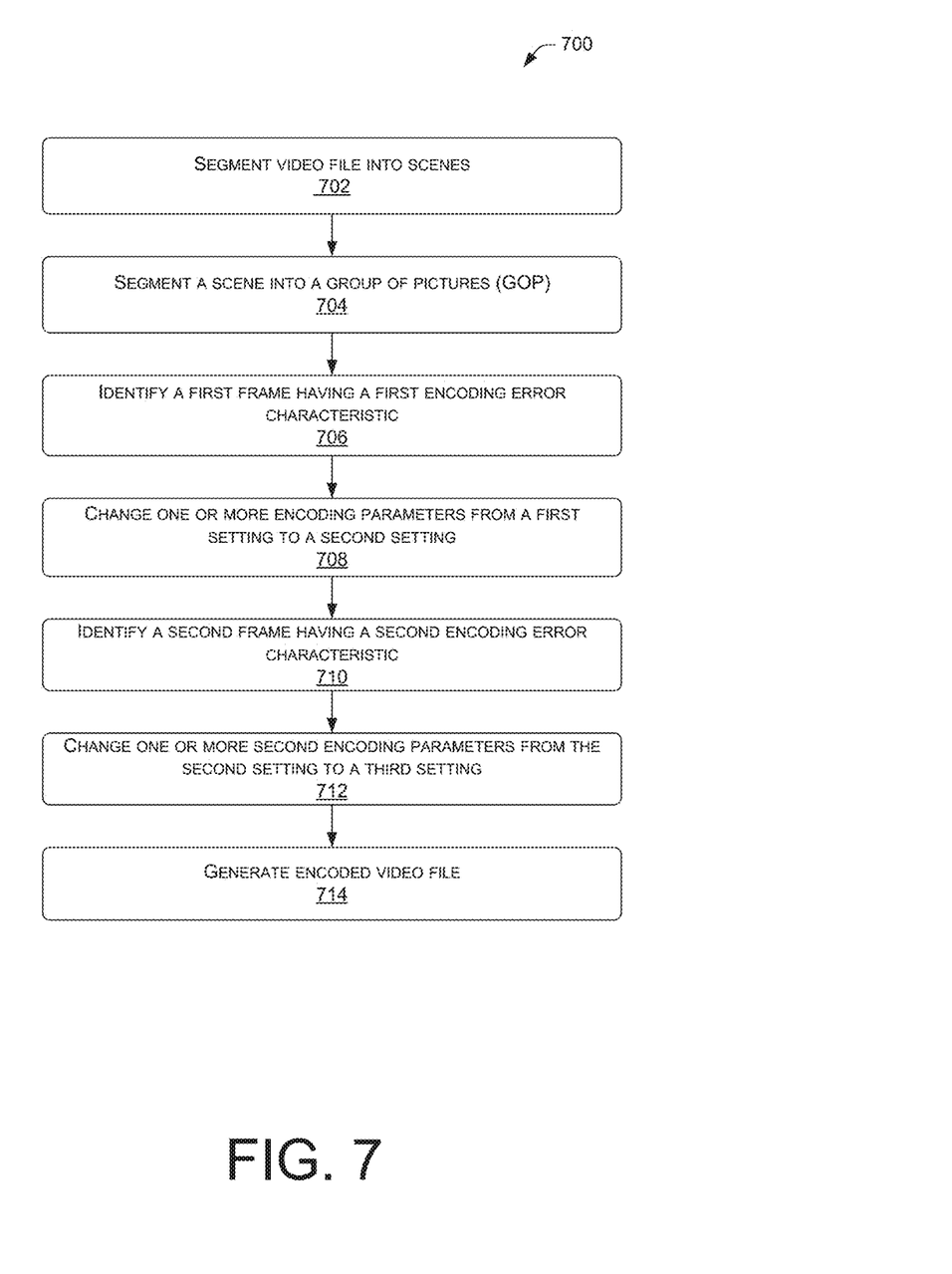
FIG. 7 is a flow diagram of an illustrative method to generate a dynamically-encoded video file, according to example embodiments of the disclosure.

FIG. 7 is a flow diagram of an illustrative method 700 to generate a dynamically-encoded video file, according to example embodiments of the disclosure. The method 700 begins with segmenting a video file into a plurality of scenes.

At step 704, the processor 202 may segment a scene into a group of pictures (GOP), and identify a first frame having a first encoding error characteristic (step 706). According to an embodiment, identifying the first frame with the error characteristic includes first identifying the error characteristic. As explained above, there are numerous known correlations between certain content in a frame and a likely response to a particular level of QP. The level of QP that should be set by the processor can be based on a degree of error that is evidenced by the information. For example, a luminance variation between neighboring macroblocks having a quantitative value of x may have a first degree of error, where another set of macroblocks may have a quantitative value of x+4, evidencing a second degree of error. Accordingly, identifying the error characteristic may include evaluating the first encoding error characteristic to determine a degree of error, and determining a source of the error by matching the first encoding error characteristic to a known plurality of encoding error causes related to a plurality of encoding error characteristics. Identifying the source of error may be, for example, identifying that the source of the error is a single point of light illuminating an otherwise dark frame. As another example, a source of error may be a mathematically noisy repeating pattern in the frame's image. Other possibilities are contemplated.

In another aspect, identifying the first frame having the first encoding error characteristic can include rendering the first frame in the first GOP by generating a plurality of images in the first frame, and segmenting the plurality of images into a set of blocks having a predetermined number of pixels in each block of the set of blocks. It is known in the art to analyze image content by counting a number of blocks having a false image edge, and assigning a value indicative of a degree of error for the encoding error characteristic based on the number of blocks having the false image edge.

In yet another aspect, evaluating the first GOP having the encoding error characteristic further can also include identifying whether the set of blocks includes a predetermined percentage of pixels having a color saturation indicative of being a dark image portion. As a greater number of blocks have higher percentages of color saturation, it may be discernable that the image is considered a "dark" image, and thus, predisposed to have an encoding error characteristic.

At step 708, the processor changes an encoding parameter from a first setting to a second setting. In one aspect, the processor 202 changes the quantization parameter from the lower resolution setting the higher resolution setting that is higher than the first setting based on the first encoding error characteristic and the degree of error for the encoding error characteristic. As discussed in greater detail previously, the quantization parameter comprises an adaptive quantization adjustment having a dynamically changeable setting that includes a plurality of settings that modify bitrate allocation within and across frames of the sequence.

At step 710, the processor identifies a second frame having a second encoding error characteristic. Identifying the second frame may be similar in technique and process as the steps described above with respect to identifying the first frame having the first encoding error.

At step 712, the processor changes the second encoding parameter from the second setting to a third setting. In one aspect the third setting may include a higher QP level than the current second setting. In another aspect the third setting may include a lower QP level than the current second setting. In another aspect the third setting may include the same QP level as the current second setting. It should be appreciated here that the system dynamically identifies, at each frame, an optimal QP level and encodes the video portion at that level.

At step 714, the processor 202 generates the encoded video file. In some aspects, the processor 202 may generate the encoded file all at once using a lookup table that match particular frames with predetermined settings for the QP level. In other aspects, the system may generate the encoded file sequentially as each frame is processed.

Embodiments described herein present a technical solution for the problem of the occurrence of digital video file encoding errors when a QP setting is set too low for difficult areas of a raw digital file. This problem is associated with computing systems that encode the files. According to one or more embodiments, the system overcomes previously experienced limitations to video encoding computing systems where file sizes of encoded video files are not optimized (made as small as possible while producing decodable output that decodes into images without artifacts or other encoding errors.

Based on the foregoing, it should be appreciated that technologies for providing a network service capable of identifying infrequently accessed data from a request stream have been disclosed herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the following claims.

What is claimed is:

1. A computer-implemented method for encoding a video file comprising:

segmenting, by a processor of a computing device, the video file into a plurality of scenes by identifying a beginning portion of a scene of the plurality of scenes and an ending portion of the scene;

identifying, by the processor and in a first sequential scene of the plurality of scenes, one or more groups of pictures (GOPs);

identifying, by the processor and sequentially from a beginning frame of the one or more GOPs, a first frame having a first encoding error characteristic, wherein the identifying comprises determining a source of an encoding error by matching the first encoding error characteristic to a known encoding error characteristic that is associated with a known encoding error of a plurality of known encoding errors, each of the plurality of known encoding errors being associated with a different known encoding error characteristic;

changing, by the processor, a bitrate allocation setting within and across one or more frames from a first setting to a second setting, the changing based on the first encoding error characteristic and a degree of the encoding error, wherein the bitrate allocation setting comprises an adaptive quantization adjustment having a dynamically changeable setting comprising a plurality of settings for bitrate quality for video encoding;

evaluating the first encoding error characteristic by:
    rendering the first frame by generating a plurality of images in the first frame;
    segmenting the plurality of images into a set of blocks having a predetermined number of pixels in individual blocks of the set of blocks;
    calculating a number of blocks having a false image edge; and
    assigning a value indicative of the degree of the encoding error for the first encoding error characteristic based on the number of blocks having the false image edge;

encoding the first frame having the first encoding error characteristic using the second setting;

identifying, by the processor, a second frame having a second encoding error characteristic;

changing, by the processor, the bitrate allocation setting from the second setting to a third setting based on the second encoding error characteristic;

encoding the second frame using the third setting;

responsive to determining that all frames in the in the video file have been encoded, generating a video container comprising a plurality of encoded GOPs from the video file; and streaming the video container to a video playback device.

2. The method of claim 1, wherein evaluating the first encoding error characteristic further comprises:

identifying whether the set of blocks includes a predetermined percentage of pixels having a predetermined color saturation;

evaluating whether the set of blocks exceeds a threshold for gradation from dark pixels having a first predetermined luminance to light pixels having a second predetermined luminance; and assigning a type of encoding error characteristic based on the number of blocks exceeding the threshold for gradation.

3. The method of claim 2, wherein changing the bitrate allocation setting from the first setting to the second setting is further based on the type of encoding error characteristic.

4. A system comprising:
one or more processors; and
memory to store computer-executable instructions that, when executed, cause the one or more processors to perform operations comprising:
determining a plurality of scenes associated with a video file;
determining at least one group of pictures (GOPs) associated with the plurality of scenes;
identifying, from a beginning frame of the video file, a first frame of the video file;
determining a first encoding error characteristic associated with the first frame;
rendering a plurality of images in the first frame;
segmenting the plurality of images into a set of blocks having a predetermined number of pixels in individual blocks of the set of blocks;
calculating a number of blocks having a false image edge;
assigning a value indicative of a degree of error for the first encoding error characteristic based at least in part on the number of blocks having the false image edge;
changing a first encoding parameter from a first setting to a second setting based at least in part on the degree of the error;
identifying a second frame of the video file having a second encoding error characteristic;
changing a second encoding parameter from the second setting to a third setting based at least in part on the second encoding error characteristic; and
generating an encoded video file comprising an encoded plurality of scenes.

5. The system of claim 4, wherein the determining the first encoding error characteristic comprises:
evaluating the first encoding error characteristic to determine the degree of the error; and
determining a source of the error by matching the first encoding error characteristic to a known encoding error characteristic that is associated with a known encoding error of a plurality of known encoding errors, each of the plurality of known encoding errors being associated with a different known encoding error characteristic.

6. The system of claim 4, wherein the first encoding parameter comprises an adaptive quantization adjustment having a dynamically changeable setting comprising a plurality of settings that modify bitrate allocation within and across frames of the sequence.

7. The system of claim 4, wherein identifying the first frame further comprises:
identifying whether the set of blocks includes a predetermined percentage of pixels having a color saturation;
evaluating whether the set of blocks exceeds a threshold for gradation from dark pixels having a first predetermined luminance to light pixels having a second predetermined luminance; and
assigning a type of encoding error characteristic based at least in part on the number of blocks exceeding the threshold for gradation.

8. The system of claim 7, wherein changing the first encoding parameter from the first setting to the second setting is further based at least in part on the type of encoding error characteristic.

9. The system of claim 8, wherein, responsive to determining that all frames in the video file have been encoded, the operations further comprise:
generating a video container comprising a plurality of encoded frames from the video file; and
streaming the video container to a video playback device.

10. The system of claim 4, wherein determining the first encoding error characteristic includes accessing a lookup table that stores a known correlation between the first encoding error characteristic and a particular setting.

11. A system comprising:
one or more processors; and
memory to store computer-executable instructions that, when executed, cause the one or more processors to perform operations comprising:
determining at least one group of pictures (GOPs) associated with a plurality of scenes in a video file;
identifying, from a beginning frame of the video file, a first frame of the video file having a first encoding error characteristic;
updating a lookup table to include first metadata identifying the first frame and a first value indicative of a first changeable bitrate allocation setting based at least in part on the first encoding error characteristic;
identifying a second frame having a second encoding error characteristic;
updating the lookup table to include second metadata identifying the second frame of the video file having the second encoding error characteristic and a second value indicative of a second changeable bitrate allocation setting based at least in part on the second encoding error characteristic;
changing the first changeable bitrate allocation setting to the second changeable bitrate allocation setting based at least in part on the first encoding error characteristic and a degree of error for the first encoding error characteristic;
rendering a plurality of images in the first frame;
segmenting the plurality of images into a set of blocks having a predetermined number of pixels in individual blocks of the set of blocks;
calculating a number of blocks having a false image edge;
assigning a value indicative of the degree of the error for the first encoding error characteristic based at least in part on the number of blocks having the false image edge; and
generating, based at least in part on the lookup table, an encoded video file comprising an encoded plurality of scenes.

12. The system of claim 11, wherein the identifying the first frame having the first encoding error characteristic comprises:
evaluating the first encoding error characteristic to determine the degree of the error; and
determining a source of the error by matching the first encoding error characteristic to a known encoding error characteristic that is associated with a known encoding error of a plurality of known encoding errors, each of the known encoding errors being associated with a different known encoding error characteristic.

13. The system of claim 11, wherein the first changeable bitrate allocation setting comprises an adaptive quantization adjustment having a dynamically changeable setting comprising a plurality of settings that modify bitrate allocation within and across frames of the sequence.

14. The system of claim 11, wherein identifying the first frame of the video file having the first encoding error characteristic comprises:
identifying whether the set of blocks includes a predetermined percentage of pixels having a color saturation;
evaluating whether the set of blocks exceeds a threshold for gradation from dark pixels having a first predetermined luminance to light pixels having a second predetermined luminance; and assigning a type of encoding error characteristic based at least in part on the number of blocks exceeding the threshold for gradation.

15. The system of claim 14, wherein changing the first changeable bitrate allocation setting to the second changeable bitrate allocation setting is further based at least in part on the type of encoding error characteristic.

16. The system of claim 11, wherein, responsive to determining that all frames in the video file have been encoded, the operations further comprise:

generating a video container comprising a plurality of encoded frames from the video file; and streaming the video container to a video playback device.

17. The system of claim 16, wherein the operations further comprise:

storing the video container in a storage service datastore; and accessing, prior to streaming the video container to the video playback device, the video container from the storage service datastore.

18. The system of claim 10, wherein the first encoding error characteristic represents a likelihood of the first frame having an error when the first frame is encoded using the particular setting.

19. The system of claim 11, wherein the first encoding error characteristic is identified based at least in part on a known correlation between the first encoding error characteristic and a particular setting.

20. The system of claim 19, wherein the first encoding error characteristic represents a likelihood of the first frame having an error when the first frame is encoded using the particular setting.

\* \* \* \* \*